(12) United States Patent
Yun

(10) Patent No.: US 10,756,340 B2
(45) Date of Patent: Aug. 25, 2020

(54) NEGATIVE ELECTRODE FOR LITHIUM METAL SECONDARY BATTERY AND METHOD FOR MANUFACTURING THE SAME

(71) Applicant: LG CHEM, LTD., Seoul (KR)

(72) Inventor: Hyun-Woong Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 44 days.

(21) Appl. No.: 16/094,164

(22) PCT Filed: Dec. 1, 2017

(86) PCT No.: PCT/KR2017/014033
§ 371 (c)(1),
(2) Date: Oct. 16, 2018

(87) PCT Pub. No.: WO2018/101800
PCT Pub. Date: Jun. 7, 2018

(65) Prior Publication Data
US 2019/0140266 A1    May 9, 2019

(30) Foreign Application Priority Data

Dec. 1, 2016 (KR) .................. 10-2016-0163028

(51) Int. Cl.
| | |
|---|---|
| H01M 4/36 | (2006.01) |
| H01M 10/052 | (2010.01) |
| H01M 4/38 | (2006.01) |
| H01M 4/1395 | (2010.01) |
| H01M 4/134 | (2010.01) |
| H01M 4/62 | (2006.01) |
| H01M 4/04 | (2006.01) |
| H01M 4/02 | (2006.01) |

(52) U.S. Cl.
CPC .......... *H01M 4/366* (2013.01); *H01M 4/134* (2013.01); *H01M 4/1395* (2013.01); *H01M 4/382* (2013.01); *H01M 4/628* (2013.01); *H01M 10/052* (2013.01); *H01M 4/0492* (2013.01); *H01M 2004/027* (2013.01)

(58) Field of Classification Search
CPC ........ H01M 4/04; H01M 4/0492; H01M 4/36; H01M 4/366; H01M 4/38; H01M 4/382; H01M 4/62; H01M 4/628; H01M 4/1395; H01M 4/134; H01M 10/052
See application file for complete search history.

(56) References Cited

U.S. PATENT DOCUMENTS

| | | | |
|---|---|---|---|
| 6,835,492 B2 | 12/2004 | Cho et al. | |
| 7,588,623 B2 | 9/2009 | Dover et al. | |
| 9,912,006 B2 | 3/2018 | Song et al. | |
| 2003/0003364 A1* | 1/2003 | Mori | H01M 4/0435 |
| | | | 429/231.95 |

FOREIGN PATENT DOCUMENTS

| | | | | |
|---|---|---|---|---|
| JP | 7-296851 A | 11/1995 | | |
| JP | 3417054 B2 | 6/2003 | | |
| JP | H07302617 | * 6/2003 | ............ | H01M 10/40 |
| KR | 2001-0037101 A | 5/2001 | | |
| KR | 10-2002-0091748 A | 12/2002 | | |
| KR | 10-2002-0095448 A | 12/2002 | | |
| KR | 10-2008-0023703 A | 3/2008 | | |
| KR | 10-2008-0057140 A | 6/2008 | | |
| KR | 10-2014-0125970 A | 10/2014 | | |
| KR | 10-2015-0088632 A | 8/2015 | | |

OTHER PUBLICATIONS

International Search Report for PCT/KR2017/014033 (PCT/ISA/210) dated Mar. 30, 2018.

* cited by examiner

*Primary Examiner* — Karie O'Neill Apicella
(74) *Attorney, Agent, or Firm* — Birch, Stewart, Kolasch & Birch, LLP

(57) ABSTRACT

The present disclosure is directed to providing improved processability by forming a protective film on the surface of lithium metal used as an electrode layer through a simple process, and to improving the cycle characteristics of a lithium metal secondary battery by forming a stable protective film. The present disclosure provides a method for manufacturing a negative electrode, including the steps of: (S1) preparing lithium metal; and (S2) dipping the lithium metal in an acid solution for 60-120 seconds to form a LiF film on the surface of lithium metal.

9 Claims, No Drawings

NEGATIVE ELECTRODE FOR LITHIUM METAL SECONDARY BATTERY AND METHOD FOR MANUFACTURING THE SAME

TECHNICAL FIELD

The present application claims priority to Korean Patent Application No. 10-2016-0163028 filed on Dec. 1, 2016 in the Republic of Korea, the disclosures of which are incorporated herein by reference. The present disclosure relates to a negative electrode for a lithium metal secondary battery and a method for manufacturing the same.

BACKGROUND ART

As electric, electronic, communication and computer industries have been developed rapidly, high-capacity batteries have been increasingly in demand. In respond to such demand, lithium metal secondary batteries using lithium metal or lithium alloy as a negative electrode having high energy density have been given many attentions.

A lithium metal secondary battery refers to a secondary battery using lithium metal or lithium alloy as a negative electrode. Lithium metal has a low density of 0.54 g/cm$^3$ and a significantly low standard reduction potential of −3.045 V (SHE: based on the standard hydrogen electrode), and thus has been spotlighted best as an electrode material for a high-energy density battery.

When using lithium metal as a negative electrode, it reacts with impurities, such as an electrolyte, water or an organic solvent, or lithium salt, thereby forming a solid electrolyte interphase (SEI) layer. Such a solid electrolyte interphase layer causes a local difference in current density, and thus accelerates formation of dendrite due to lithium metal upon charging. In addition, such dendrite grows gradually during charging and discharging to cause an internal short-circuit between a positive electrode and a negative electrode. Further, dendrite has a mechanically weak part like a bottle neck, and thus forms dead lithium which loses electric contact with a current collector during discharging, resulting in a decrease in battery capacity and degradation of cycle life and battery stability.

To solve the above-mentioned problems, a method for forming a protective film on the surface of lithium metal has been suggested. Japanese Patent Publication No. 3417054 discloses a method for forming a protective film on the surface of a negative electrode by using HF generated in an electrolyte after incorporating a lithium salt for generating HF and water to the electrolyte. However, the protective film formed by the above-mentioned method causes adhesion of various compounds to the lithium metal surface depending on the ingredients of organic solvent or lithium salt in the electrolyte, add thus provides low purity of LiF ingredient in the protective layer and shows a small thickness of LiF layer. In addition, charging/discharging processes are essentially included in forming the protective layer. Such a conventional method for forming a protective layer is problematic in that it includes a complicated process, provides low productivity and has a difficulty in forming a protective film.

DISCLOSURE

Technical Problem

The present disclosure is directed to providing a method for manufacturing a negative electrode for a lithium metal second battery which can form a protective film on the surface of a negative electrode for a lithium metal secondary battery through a simple process and can form a stable protective film.

Technical Solution

In one aspect of the present disclosure, there is provided a negative electrode for a lithium metal secondary battery. According to an embodiment of the present disclosure, there is provided a negative electrode including: an electrode active material layer including lithium metal; and a protective film formed on the surface of the electrode layer, wherein the protective film includes LiF ingredient and has a thickness of 1 μm-20 μm and a porosity of 25%-50%.

According to a second embodiment of the present disclosure, there is provided the negative electrode of the first embodiment, wherein the electrode active material layer includes lithium metal foil which has a thickness of 20 μm-40 μm.

According to a third embodiment of the present disclosure, there is provided a method for manufacturing a negative electrode for a lithium metal secondary battery, and a resulting electrode thereof is a negative electrode according to the first embodiment or second embodiment of the present invention. The method includes the steps of: (S11) preparing a negative electrode material provided with an electrode active material layer; and (S12) dipping the negative electrode material in an acid solution for a predetermined time to form a LiF protective film on the surface of the electrode active material layer, wherein the electrode active material layer includes lithium metal.

According to a fourth embodiment of the present disclosure, there is provided the method of the third embodiment, wherein step (S12) is carried out for a period of time equal to or more than 60 seconds and less than 200 seconds.

According to a fifth embodiment of the present disclosure, there is provided the method of the third or the fourth embodiment, wherein the acid solution includes HF.

According to a sixth embodiment of the present disclosure, there is provided the method of any one of the third to the fifth embodiments, wherein the acid solution includes polyethylene glycol (PEG).

According to a seventh embodiment of the present disclosure, there is provided the method of any one of the third to the sixth embodiments, wherein the electrode active material layer includes lithium metal foil which has a thickness of 20 μm-40 μm, and the LiF protective film has a thickness of 1 μm-20 μm.

According to an eighth embodiment of the present disclosure, there is provided the method of any one of the third to the seventh embodiments, which further includes a step of activating the surface of the electrode layer by carrying out mechanical etching, chemical etching, electrochemical etching or plasma etching of the surface of the electrode active material layer, before carrying out step (S12).

According to a ninth embodiment of the present disclosure, there is provided an electrode assembly including a negative electrode, a positive electrode and a separator interposed between the negative electrode and the positive electrode, wherein the negative electrode is defined in the first or the second embodiment.

In another aspect of the present disclosure, there is also provided a method for manufacturing a secondary battery. According to a tenth embodiment of the present disclosure, the method for manufacturing a secondary battery includes the steps of: (S21) preparing a negative electrode, a positive electrode and a separator; (S22) interposing the separator between the negative electrode and the positive electrode to provide an electrode assembly; and (S23) inserting the electrode assembly to a battery casing material and injecting an electrolyte thereto, wherein the negative electrode has the characteristics as described above.

Advantageous Effects

The method for manufacturing a negative electrode according to an embodiment of the present disclosure can provide improved processability by forming a protective film on the surface of lithium metal used as an electrode layer through a simple process, and can improve the cycle characteristics of a lithium metal secondary battery by forming a stable protective film.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'. Hereinafter, the present disclosure will be explained in more detail.

Negative Electrode for Lithium Metal Secondary Battery

The present disclosure provides a negative electrode (i.e. anode) for a lithium metal secondary battery. The negative electrode includes: an electrode active material layer including lithium metal; and a protective film formed on the surface of the electrode layer, wherein the protective film includes LiF.

According to an embodiment of the present disclosure, the electrode active material layer may include lithium metal which may have a metal foil shape having a thickness of 20 $\mu$m-40 $\mu$m. Meanwhile, the negative electrode is provided with an electrode active material layer which may include a current collector and a lithium metal-containing electrode active material layer provided on at least one surface of the current collector. For example, the electrode active material layer may include lithium metal foil or lithium powder attached to one surface of the current collector through compression. Otherwise, the negative electrode may be provided with lithium metal-containing foil alone without any current collector.

The protective film essentially includes LiF. As used herein, the term 'essentially' refers to a content of 50% or more in terms of weight and/or volume. According to an embodiment of the present disclosure, the protective film has a high purity of LiF ingredient and may include LiF ingredient in an amount of 50 wt % or more, 70 wt % or more, 80 wt % or more, 90 wt % or more, 95 wt % or more, or 99 wt % or more, based on 100 wt % of the protective film.

According to another embodiment of the present disclosure, the protective film may have a thickness of 1 $\mu$m-20 $\mu$m. According to a particular embodiment of the present disclosure, the protective film may have a thickness of 2 $\mu$m or more, 3 $\mu$m or more, 4 $\mu$m or more, 5 $\mu$m or more, or 6 $\mu$m or more, and 18 $\mu$m or less, 16 $\mu$m or less, 12 $\mu$m or less, 10 $\mu$m or less, 8 $\mu$m or less, 6 $\mu$m or less, or 5 $\mu$m or less within the above-defined range.

The negative electrode according to the present disclosure includes a protective film containing a high purity of LiF with the above-defined range of thickness, wherein the film has high physical and chemical stability to provide a battery with improved cycle characteristics.

According to still another embodiment of the present disclosure, the protective film has a porosity of approximately 25%-50%, approximately 25%-45%, approximately 25%-40%, approximately 25%-35%, or approximately 25%-30%. When the porosity satisfies the above-defined range, it is possible to provide improved resistance characteristics and mechanical strength.

Method for Manufacturing Negative Electrode

Next, a method for manufacturing the negative electrode will be explained. The conventional lithium metal secondary battery causes a problem of degradation of cycle characteristics of a battery due to side reactions, when lithium metal is used for the electrode active material layer of the negative electrode. To prevent such a problem, a method for forming a protective film on the surface of lithium metal has been suggested. However, the method includes a complicated process to cause degradation of productivity, and has a difficulty in forming a protective film because the method provides a film having a non-uniform thickness or cannot ensure a desired level of film thickness.

According to the present disclosure, lithium metal is dipped in an acid solution for a predetermined time to form a stable protective film on the surface of lithium metal. Thus, it is possible to improve productivity of lithium metal through a simple process and to provide a lithium metal secondary battery with improved cycle characteristics through such a stable protective film.

According to the present disclosure, the method for manufacturing a negative electrode includes the steps of: (S1) preparing a negative electrode material; and (S2) dipping the negative electrode material in an acid solution to form a protective film on the surface of the negative electrode material.

In step (S1), the negative electrode material may include lithium metal. According to an embodiment of the present disclosure, lithium metal may be provided in the form of metal foil having a thickness of 20 $\mu$m-40 $\mu$m. According to another embodiment of the present disclosure, the negative electrode material may be provided with an electrode active material layer so that it may be used as a negative electrode, and may include a current collector and a lithium metal-containing electrode active material layer provided on at least one surface of the current collector. For example, the negative electrode material may include lithium metal foil or lithium powder attached to one surface of the current collector through compression. Otherwise, the negative electrode may be provided with lithium metal-containing foil alone without any current collector.

According to another embodiment of the present disclosure, the method may further include a step of removing a solid electrode interphase film formed on the surface of the negative electrode material, particularly on the surface of lithium metal, and activating the surface of the negative electrode material by carrying out mechanical etching, chemical etching, electrochemical etching or plasma etching of the surface of the lithium metal-containing negative electrode material, before carrying out step (S2).

According to still another embodiment of the present disclosure, the step of activating the surface of lithium metal is carried out by subjecting the lithium metal surface to a conventional etching process, such as mechanical etching, chemical etching, electrochemical etching or plasma etching. Herein, mechanical etching may be carried out by using a scratching means such as a nylon brush, in addition to the conventional etching processes, such as polishing, grinding or lapping. When the lithium metal surface is activated as mentioned above, it is possible to remove the impurities on the lithium metal surface and the solid electrolyte interphase layer, while increasing the surface area of lithium capable of reacting with a polymer film, and thus it is possible to improve the reactivity.

Next, the negative electrode material prepared from step (S1) is immersed in an acid solution (step (S2)). According to an embodiment of the present disclosure, the dipping in step (S2) may be carried out for a time sufficient to form a protective film on the lithium metal surface to a predetermined thickness. The protective film may be formed to a thickness of 1 μm-20 μm. However, the thickness of the protective film (LiF layer) is not limited to the above-defined range and may be varied adequately depending on the purpose of use or characteristics of a battery. According to a particular embodiment, the dipping may be carried out for a period of time equal to or more than 60 seconds and less than 200 seconds. In addition, the dipping time may be controlled adequately within the above-defined time range. For example, the dipping may be carried out for 70 seconds or more, 80 seconds or more, 100 seconds or more, 120 seconds or more, or 150 seconds or more. Further, the dipping may be carried out for 190 seconds or less, 180 seconds or less, 160 seconds or less, 130 seconds or less, or 100 seconds or less, within the above-defined time range.

When the lithium metal dipping time is less than 60 seconds, the protective film is formed to an excessively small thickness so that it is not possible to improve the cycle characteristics sufficiently. When the dipping time is more than 200 seconds, the protective film is formed to an excessively large thickness, thereby providing a decreased amount of excess lithium source and causing an excessive increase in interfacial resistance.

Meanwhile, the metal (e.g. aluminum, copper, SUS, etc.) used as a current collector includes HF in such a small amount that it is not oxidized. Since the time during which the negative electrode material is dipped is very short, the current collector is little oxidized even when the negative electrode material includes the current collector. Even when the current collector is oxidized to a certain degree, there is no adverse effect upon the functions as current collector.

According to an embodiment of the present disclosure, the protective film essentially includes LiF. According to another embodiment of the present disclosure, the acid solution may be a solution containing HF in an organic solvent in order to form a protective film (LiF layer) essentially including LiF. Herein, HF may be contained at a concentration of 3,000-10,000 ppm. According to still another embodiment of the present disclosure, the organic solvent may be a carbonate solvent and particular examples thereof include at least one selected from propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate, or a combination thereof, a halogen derivative thereof, linear ester, linear ether, cyclic ether, and the like.

Meanwhile, according to another embodiment of the present disclosure, it is preferred to carry out step (S2) at a temperature of the acid solution of 15° C. or lower, or 10° C. or lower, considering the boiling point of HF of 19.5° C.

According to still another embodiment of the present disclosure, the acid solution may further include a reaction controller. A non-ionic surfactant may be used as the reaction controller, and the non-ionic surfactant includes at least one of polyethylene glycol (PEG) and a polyethylene glycol-based compound. According to still another embodiment of the present disclosure, non-limiting examples of the polyethylene glycol-based compound include an ether type compound such as polyoxyethylene; ester type compound such as polyethylene glycol fatty acid ester; or a nitrogen-containing compound such as polyoxyethylene fatty acid amide. The above-mentioned compounds may be used alone or in combination.

The reaction controller inhibits rapid reaction between HF and lithium metal so that it may assist formation of a uniform and dense protective film (LiF layer). When using no reaction controller, HF may react with lithium metal rapidly, thereby forming a highly porous protective film (LiF layer). When the porosity is high, conduction of lithium ions may be facilitated to improve resistance characteristics. However, when the porosity is high, the density of the protective film (LiF layer) may be decreased to cause generation of cracking easily. In addition, when using no reaction controller, LiF ingredient may be concentrated locally at a specific portion, thereby causing degradation of film uniformity. Therefore, it is possible to improve the uniformity and density of the protective film by introducing a reaction controller to control (reduce) the reaction rate of LiF formation. According to an embodiment of the present disclosure, the reaction controller may be contained in the acid solution in an amount of 50 ppm-500 ppm. Meanwhile, according to another embodiment of the present disclosure, the amount of the reaction controller may be 100 ppm or more, 150 ppm or more, 200 ppm or more, or 300 ppm or more. In addition, the reaction controller may be used in an amount of 450 ppm or less, 400 ppm or less, or 350 ppm or less, within the above-defined range. According to the present disclosure, it has been found that a negative electrode material prepared by the method using no reaction controller shows a porosity of LiF layer of approximately 30%-50%. On the contrary, it was possible to control the porosity of LiF layer to approximately 25%-35% by using a reaction controller.

As described above, the negative electrode according to the present disclosure has a thickness of protective film (LiF layer) of 1 μm-20 μm. The LiF layer may be formed to have a desired thickness within the above-defined range by controlling the concentration of LiF in the acid solution, dipping time, or the like. In addition, according to the present disclosure, the LiF layer of the negative electrode may have a porosity of approximately 25%-50%.

When the porosity is less than the above-defined range, resistance may be increased to cause degradation of the performance of a battery. On the other hand, when the porosity is higher than the above-defined range, the LiF layer may have decreased mechanical strength so that it is not preferred as a protective film.

The density of LiF layer may be obtained by measuring the volume and weight of the LiF layer and inserting the measured density calculated from the measured values and the theoretical density (2.635 g/cm$^3$) of LiF to the following Formula 1. The volume of LiF layer may be obtained by measuring the area and thickness of a sample, and the weight may be obtained from a difference in weight of lithium metal foil before and after LiF is formed.

Porosity (%)=(1−(measured density/theoretical density of LiF))×100   [Formula 1]

According to the present disclosure, the LiF layer in the negative electrode has a significantly high purity of LiF ingredient, may have a thickness of 20 μm and may be controlled to have a porosity of 25%-35%, and thus it may function well as a protective film having excellent mechanical properties while not causing degradation of resistance characteristics of a cell.

Lithium Metal Secondary Battery

The present disclosure provides an electrode assembly for a lithium metal secondary battery and a secondary battery including the electrode assembly. The electrode assembly includes a negative electrode (i.e. anode), a positive electrode (i.e. cathode) and a separator interposed between the negative electrode and the positive electrode. The secondary battery includes the above-mentioned electrode assembly and an electrolyte. In the electrode assembly, the negative electrode is the same as disclosed herein and may be provided with a LiF-containing protective film. Particularly, the negative electrode may include lithium metal foil provided with LiF-containing protective film.

Meanwhile, the negative electrode may be one obtained by the method according to the present disclosure. According to the present disclosure, the negative electrode may include lithium metal foil provided with a LiF-containing protective film alone or in combination with a current collector provided on the opposite side of the surface having the protective film.

According to an embodiment of the present disclosure, the battery may be obtained by the method including the steps of: (S21) preparing a negative electrode, a positive electrode and a separator; (S22) interposing the separator between the negative electrode and the positive electrode to provide an electrode assembly; and (S23) inserting the electrode assembly to a battery casing material and injecting an electrolyte thereto, wherein the negative electrode is the same as disclosed herein.

The battery according to the present disclosure includes an electrode assembly obtained by using a negative electrode provided with a protective film having the above-described characteristics before injecting an electrolyte. Thus, the protective film may be prepared so that it may satisfy predetermined standard conditions of constitutional characteristics, such as thickness, ingredients and porosity. In other words, it is possible to control the protective film to satisfy the above-defined ranges. In addition, the characteristics of the protective film are not affected by the ingredients of electrolyte or charging/discharging conditions. Further, since formation of a protective film may not be considered when selecting electrolyte ingredients, selection of electrolyte ingredients may be made in a broader spectrum.

Meanwhile, according to an embodiment of the present disclosure, the positive electrode may be obtained by applying a mixture of a positive electrode active material, a conductive material and a binder to a positive electrode current collector, followed by drying. If desired, the mixture may further include a filler. Particular examples of the positive electrode active material may include, but are not limited to: layered compounds such as lithium cobalt oxide (LiCoO$_2$) and lithium nickel oxide (LiNiO$_2$), or those compounds substituted with one or more transition metals; lithium manganese oxides such as those represented by the chemical formula of Li$_{1+x}$Mn$_{2-x}$O$_4$ (wherein x is 0-0.33), LiMnO$_3$, LiMn$_2$O$_3$ and LiMnO$_2$; lithium manganese composite oxides represented by the chemical formula of Li$_2$Mn$_3$MO$_8$ (wherein M=Fe, Co, Ni, Cu or Zn); lithium copper oxide (Li$_2$CuO$_2$); vanadium oxides such as LiV$_3$O$_8$, LiFe$_3$O$_4$, V$_2$O$_5$ or Cu$_2$V$_2$O$_7$; Ni-site type lithium nickel oxides represented by the chemical formula of LiNi$_{1-x}$M$_x$O$_2$ (wherein M is Co, Mn, Al, Cu, Fe, Mg, B or Ga, and x is 0.01-0.3); lithium manganese composite oxides represented by the chemical formula of LiMn$_{2-x}$M$_x$O$_2$ (wherein M=Co, Ni, Fe, Cr, Zn or Ta, and x is 0.01-0.1) or Li$_2$Mn$_3$MO$_8$ (wherein M=Fe, Co, Ni, Cu or Zn); LiMn$_2$O$_4$ in which Li is partially substituted with an alkaline earth metal ion; disulfide compounds; Fe$_2$(MoO$_4$)$_3$; or the like.

In general, the positive electrode current collector may have an adequate thickness within a range of 3 μm-500 μm. The positive electrode current collector is not particularly limited, as long as it causes no chemical change in the corresponding battery and has high conductivity. Particular examples of the current collector may include stainless steel; aluminum; nickel; titanium; baked carbon; copper; stainless steel surface-treated with carbon, nickel, titanium or silver; or the like. It is possible to increase the adhesion of a positive electrode active material by forming fine surface irregularities on the surface of a current collector. The current collector may have various shapes, such as a film, sheet, foil, net, porous body, foam and a non-woven web body.

The binder for a positive electrode active material assists binding of an active material with a conductive material and binding to a current collector. In general, the binder is added in an amount of 1-50 wt % based on the total weight of the positive electrode mixture. The binder may include a high-molecular weight polyacrylonitrile-co-acrylic acid, but is no limited thereto. Other examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like.

The separator is interposed between the positive electrode and the negative electrode and may be an insulating thin film having high ion permeability and mechanical strength. In general, the pore diameter of the separator is 0.01-10 μm and the thickness of the separator is 5-300 μm. Particular examples of the separator include: olefin polymers such as chemically resistant and hydrophobic polypropylene; sheets or non-woven webs made of glass fibers or polyethylene; or the like. According to an embodiment of the present disclosure, the separator may be provided with a heat resistant layer on at least one surface thereof, wherein the heat resistant layer includes a mixture of inorganic particles with a binder resin. The inorganic particles are not particularly limited, as long as they are electrochemically stable in a range of operating voltage of a battery. Non-limiting examples of the inorganic particles include $SiO_2$, $Al_2O_3$, $TiO_2$, $Li_3PO_4$, zeolite, MgO, CaO, $BaTiO_3$, or the like.

The secondary battery according to the present disclosure may be obtained by introducing/sealing an electrode assembly including positive electrodes and negative electrode stacked alternately with separators to/in a casing material, such as a battery casing, together with an electrolyte. Any conventional methods for manufacturing a secondary battery may be used with no particular limitation.

According to an embodiment of the present disclosure, the negative electrode may include a negative electrode active material layer having a mixture of the first negative electrode active material and the second negative electrode active material with uniform distribution, or a negative electrode active material layer having at least one first negative active material layer containing the first negative electrode active material stacked alternately with at least one second negative electrode active material layer containing the second negative electrode active material.

In addition, the electrolyte includes an organic solvent and a predetermined amount of lithium salt. Particular examples of the organic solvent include at least one selected from propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), γ-butryolactone (GBL), fluoroethylene carbonate, methyl formate, ethyl formate, propyl formate, methyl acetate, ethyl acetate, propyl acetate, pentyl acetate, methyl propionate, ethyl propionate, propyl propionate, butyl propionate, or a combination thereof, and halogen derives of the organic solvents and linear esters may be used. The lithium salt is a material that can be dissolved easily in the non-aqueous electrolyte. Particular examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylate, lithium tetraphenylborate, imide, or the like.

Meanwhile, elements other than the above-described battery elements may be used, as long as they are used conventionally in the field of batteries, particularly in the field of lithium secondary batteries.

In another aspect, there is provided a battery module including the secondary battery as a unit cell and a battery pack including the same. The battery module and the battery pack include a secondary battery which shows excellent rapid charging characteristics under a high-loading condition, and thus can be used as an electric power source for electric vehicles, hybrid electric vehicles, plug-in hybrid electric vehicles and power storage systems.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

1. EXAMPLES (1) Preparation of Negative Electrode

1) Examples 1-4

Lithium metal foil having a thickness of 30 μm was prepared, and the lithium metal was dipped in an acid solution containing HF at a concentration of 3000 ppm in polypropylene carbonate for a predetermined time and was taken out therefrom. It was shown that a LiF protective film was formed on the surface of lithium metal. The dipping time and thickness (thickness of one surface) of the LiF protective film applied to each Example is shown in the following Table 1.

TABLE 1

| Example | Dipping time (sec) | Thickness of LiF layer (μm) |
|---------|--------------------|-----------------------------|
| 1 | 10 | 1 |
| 2 | 30 | 3 |
| 3 | 50 | 5 |
| 4 | 100 | 10 |

2) Example 5

Polyethylene glycol (PEG) was further added to the acid solution used in Example 1 (150 ppm) and the dipping time was set to 240 seconds. The formed protective film had a thickness of 5 μm and a porosity of 33%.

(2) Manufacture of Battery

Each of the negative electrodes obtained from Examples 1-5 was used to obtain a battery. Positive electrode slurry was prepared by mixing 96 wt % of $LiNi_{0.6}Mn_{0.2}Co_{0.2}O_2$, $D_{50}$ 13 μm, 1 wt % of Denka black (conductive material) and 3 wt % of PVDF. The slurry was coated onto one surface of an aluminum current collector to a thickness of 125 μm and dried at 80° C. with hot air. The dried electrode was pressed to a thickness of 111 μm by using a roll press. Each of the negative electrodes according to Examples 1-5 and the positive electrode were used to manufacture an electrode assembly by inserting a separator (made of polypropylene, Celgard) therebetween, and an electrolyte (ethylene carbonate:dimethyl carbonate=3:7, volume ratio, 1M $LiPF_6$) was injected thereto to obtain a coin cell.

2. COMPARATIVE EXAMPLES (1) Preparation of Negative Electrode

Comparative Example 1

Lithium metal foil (thickness 30 μm) subjected no acid treatment was prepared.

Comparative Example 2

Lithium metal foil (thickness 30 μm) was introduced to a quartz tubular reactor and warmed to approximately 160° C. under fluorine atmosphere. Then, the temperature was reduced to 130° C. and the same temperature was maintained. While the same temperature was maintained under the supply of $O_2$, the lithium metal foil was sintered for 2 hours to obtain a negative electrode material having LiF formed to a thickness of about 1 μm. The LiF layer of the negative electrode material obtained from Comparative Example 2 had a porosity of about 5%.

Comparative Example 3

Lithium metal having a thickness of 30 μm was prepared. Then, 15 g of PVDF-HFP copolymer (trade name: Kynar) 2801, 20 g of dibutyl phthalate and 10 g of silica were dissolved in acetone and the resultant mixture was cast on the top of a PET film having a thickness of 25 μm to obtain a polymer film reactive to lithium metal. The film was dipped in methanol for about 1 hour to extract dibutyl phthalate and dried in a vacuum oven at 70° C. for 12 hours or more to obtain a dry polymer single film having a thickness of 20 μm. The polymer film was placed on the surface of lithium metal and pressing was carried out by using a Teflon roller to perform adhesion. Then, the resultant product was allowed to stand at room temperature for 24 hours to obtain a negative electrode provided with a protective film having a thickness of 1 μm.

Comparative Example 4

Lithium metal having a thickness of 30 μm was prepared. The lithium metal was dipped in an acid solution containing HF in polypropylene carbonate at a concentration of 3000 ppm for 200 seconds and was taken out therefrom. It was shown that a protective film having a thickness of 20 μm was formed on the surface of lithium metal.

(2) Manufacture of Battery

Each of the negative electrodes obtained from Comparative Examples 1-4 was used to obtain a battery. Positive electrode slurry was prepared by mixing 96 wt % of $LiNi_{0.6}Mn_{0.2}Co_{0.2}O_2$, $D_{50}$ 13 μm, 1 wt % of Denka black (conductive material) and 3 wt % of PVDF. The slurry was coated onto one surface of an aluminum current collector to a thickness of 125 μm and dried at 80° C. with hot air. The dried electrode was pressed to a thickness of 111 μm by using a roll press. Each of the negative electrodes according to Comparative Examples 1-4 and the positive electrode were used to manufacture an electrode assembly by inserting a separator (made of polypropylene, Celgard) therebetween, and an electrolyte (ethylene carbonate:dimethyl carbonate=3:7) was injected thereto to obtain a mono-cell.

Determination of Initial Capacity

Each of the mono-cells according to Examples 1-5 and Comparative Examples 1-4 was used to determine initial capacity under the conditions of charging at 0.2C/discharging at 0.2C (design capacity: 40 mAh).

Cycle Evaluation

Each of the mono-cells according to Examples 1-5 and Comparative Examples 1-4 was used to evaluate life characteristics up to 200 cycles under the condition of charging at 0.5C/discharging at 0.5C. The results are shown in the following Table 2.

Test Evaluation

In Examples 1-5, it was determined that each battery has excellent initial capacity and life characteristics. Particularly, Example 5 showed the best life characteristics.

In the case of Comparative Example 4, the LiF layer was formed excessively to cause a decrease in excess Li source amount and a rapid increase in interfacial resistance. Thus, it was shown that the capacity was decreased from the first cycle.

In addition, referring to the following Table 2, in the case of Examples in which dipping is carried out by using a HF acid solution for a predetermined time, the LiF layer was formed to an adequate thickness. Thus, the batteries showed higher cycle characteristics as compared to Comparative Examples 1-4.

Further, it was shown that the batteries using a negative electrode having a protective film formed by using an acid solution provide higher cycle characteristics as compared to the batteries having a LiF layer formed by using a deposition process or Teflon roller.

Additionally, as demonstrated from Examples and Comparative Examples, a smaller thickness of LiF layer provides lower resistance and is more favorable to initial capacity and life characteristics. When using PEG as a reaction controller (Example 5), the battery showed significantly higher life characteristics even though the LiF layer was formed to a thickness similar to the thickness in the case of Examples 1-4. It is thought that such a result is derived from PEG used as a reaction controller inhibiting rapid reaction and formation of a more uniform film having higher porosity.

TABLE 2

|  | Initial capacity (mAh) | Life characteristics 200 cycles (%) |
| --- | --- | --- |
| Example 1 | 40.2 | 85 |
| Example 2 | 39.5 | 80 |
| Example 3 | 39.4 | 81 |
| Example 4 | 38.1 | 70 |
| Example 5 | 39.8 | 93 |
| Comp. Ex. 1 | 40.3 | 25 |
| Comp. Ex. 2 | 39.5 | 62 |
| Comp. Ex. 3 | 39.7 | 60 |
| Comp. Ex. 4 | 35.5 | 40 |

The present disclosure has been described in detail with reference to specific embodiments and drawings, but it should be understood that the present disclosure is not limited thereto. In addition, various changes and modifications within the scope of the disclosure will become apparent to those skilled in the art from this detailed description.

What is claimed is:

1. A negative electrode for a lithium metal secondary battery, comprising: an electrode active material layer including lithium metal; and a protective film formed on the surface of the electrode layer, wherein the protective film comprises LiF ingredient and has a thickness of 1 μm-20 μm and a porosity of 25%-50%.

2. The negative electrode for a lithium metal secondary battery according to claim 1, wherein the electrode active material layer comprises lithium metal foil which has a thickness of 20 μm-40 μm.

3. A method for manufacturing a negative electrode for a lithium metal secondary battery, comprising the steps of:
   (S11) preparing a negative electrode material provided with an electrode active material layer; and
   (S12) dipping the negative electrode material in an acid solution for a period of time equal to or more than 60 seconds and less than 200 seconds to form a LiF protective film on the surface of the electrode active material layer, wherein the electrode active material layer comprises lithium metal.

4. The method for manufacturing a negative electrode for a lithium metal secondary battery according to claim 3, wherein the acid solution comprises HF.

5. The method for manufacturing a negative electrode for a lithium metal secondary battery according to claim 3, wherein the acid solution comprises polyethylene glycol (PEG).

6. The method for manufacturing a negative electrode for a lithium metal secondary battery according to claim 3, wherein the electrode active material layer comprises lithium metal foil which has a thickness of 20 μm-40 μm, and the LiF protective film has a thickness of 1 μm-20 μm.

7. The method for manufacturing a negative electrode for a lithium metal secondary battery according to claim 3, which further comprises a step of activating the surface of the electrode layer by carrying out mechanical etching, chemical etching, electrochemical etching or plasma etching of the surface of the electrode active material layer, before carrying out step (S12).

8. An electrode assembly comprising a negative electrode, a positive electrode and a separator interposed between the negative electrode and the positive electrode, wherein the negative electrode is defined in claim 1.

9. A method for manufacturing a secondary battery, comprising the steps of:
  (S21) preparing a negative electrode, a positive electrode and a separator;
  (S22) interposing the separator between the negative electrode and the positive electrode to provide an electrode assembly; and
  (S23) inserting the electrode assembly to a battery casing material and injecting an electrolyte thereto, wherein the negative electrode is defined in claim 1.

* * * * *